United States Patent [19]

Komachi

[11] Patent Number: 5,665,136
[45] Date of Patent: Sep. 9, 1997

[54] PROCESS FOR PRODUCING MICRO LENSES USING A LASER BEAM

[75] Inventor: Yuichi Komachi, Tokyo, Japan

[73] Assignee: Machida Endoscope Co., Ltd., Tokyo, Japan

[21] Appl. No.: 490,486

[22] Filed: Jun. 14, 1995

[30] Foreign Application Priority Data

Jun. 29, 1994 [JP] Japan .................... 6-170201

[51] Int. Cl.$^6$ ........................... C03B 29/00
[52] U.S. Cl. .............. 65/102; 65/33.2; 65/111; 65/268; 65/269; 65/273; 65/284; 65/DIG. 4; 219/121.65; 219/121.66; 219/121.68; 219/121.69
[58] Field of Search ............ 65/33.2, 102, 111, 65/106, 268, 269, 273, 284, DIG. 4; 269/121.65, 121.66, 121.68, 121.69

[56] References Cited

U.S. PATENT DOCUMENTS

| | | | |
|---|---|---|---|
| 1,466,973 | 9/1923 | Takanashi | 65/269 |
| 3,588,440 | 6/1971 | Morse | 65/DIG. 4 |
| 4,764,485 | 8/1988 | Loughran et al. | 219/121.65 |
| 4,932,989 | 6/1990 | Presby | 65/284 |
| 5,080,706 | 1/1992 | Snyder et al. | 65/102 |
| 5,118,923 | 6/1992 | Farina | 219/121.65 |
| 5,143,578 | 9/1992 | Luthi | 219/121.68 |
| 5,484,467 | 1/1996 | Nass et al. | 65/111 |

FOREIGN PATENT DOCUMENTS

| | | |
|---|---|---|
| 0535620 | 4/1993 | European Pat. Off. |
| 2594059 | 8/1987 | France . |
| 2344050 | 3/1975 | Germany . |
| 55-109237 | 8/1980 | Japan . |
| 61-275138 | 12/1986 | Japan . |
| 1367767 | 9/1974 | United Kingdom . |

OTHER PUBLICATIONS

Suzuki, Kaoru et al., "Processing of Glass Micro Lens Array by CO2 Laser", The Review of Laser Engineering, Feb., 1987, pp. 46–52.

U.C. Paek et al., "Formation of a Spherical Lens at Optical Fiber Ends with a $CO_2$ Laser," Applied Optics, vol. 14, No. 2, American Institute of Physics, New York, Feb. 1975, pp. 294–298.

European Search Report dated Oct. 2, 1995.

*Primary Examiner*—Donald E. Czaja
*Assistant Examiner*—Michael P. Colaianni
*Attorney, Agent, or Firm*—Fish & Richardson P.C.

[57] ABSTRACT

Converged laser beam are irradiated, at right angles, to the surface of a workpiece which is made of glass and supported in a horizontal posture, so that the surface of the workpiece is locally heated and melted. The surface of the workpiece is formed into a convexly curved surface under the effect of surface tension occurrable to the glass material at the time the surface of the workpiece is melted. By hardening the workpiece, a micro lens having the convexly curved surface is formed.

5 Claims, 2 Drawing Sheets

1.8 μm

PROCESS FOR PRODUCING MICRO LENSES USING A LASER BEAM

BACKGROUND OF THE INVENTION

This invention relates to a process for producing micro lens.

A micro lens, in general, refers to a lens having a small diameter (for example, about 1 mm or less, though not very strict). Such a micro lens is conventionally produced by several methods as set forth below.

In the first method, an ultraviolet ray is irradiated to a flat plate of a photosensitive glass material through a matrix member obtained by arranging a plurality of circular shielding portions in a matrix pattern. That portion of the flat plate, to which the ultraviolet ray is irradiated, is crystallized and contracted in volume in the next following heating process. As a consequence, the remaining portion of the flat plate, to which the ultraviolet ray is not irradiated, is expanded under the effect of a compressive force and allowed to project from a surface of the glass plate to thereby form a convexly curved surface. Each portion having the convexly curved surface becomes the micro lens. In this way, a plurality of micro lenses are formed on the glass plate in a two-dimensional matrix pattern to provide a micro lens array.

The first method has such a drawback that only special glass material having photosensitive properties can be used. Further, since a heating process for crystallizing the material is required after the irradiation of the ultraviolet ray, the manufacturing cost is high.

In the second method, a mask having a number of circular opening portions formed in a matrix pattern is coated on a flat plate made of a glass material. The glass plate is then dipped into a solution containing ions for providing a high refractive index. As a result, ion exchange is taken place only at the surface of the glass plate corresponding to the opening portions of the mask and the refractive index is locally distributed. Each portion of the glass plate having such a distribution of refractive index becomes a micro lens. In this way, a number of such micro lenses are formed on the glass plate in a matrix pattern to provide a micro lens array.

The second method has such drawbacks that the ion exchange process is troublesome because the process is executed at a high temperature for a long time and the manufacturing cost is high.

The third method is disclosed in a thesis under the heading of "processing of Glass Micro Lens Array by $Co_2$ Laser" issued February, 1987 by "The Review of Laser Engineering". According to this method, a soda glass plate having a comparatively low glass transition point is heated at 300° C. Parallel laser beam are converged by a lens and irradiated to the surface of the heated glass plate. By doing this, the refractive index is locally varied to form a micro lens. It should be noted here that the surface of the glass plate is flat as in the case with the second method and only the refractive index is locally varied.

The third method has such drawbacks that the manufacturing cost is high because heating is required, and it is difficult to symmetrically distribute the refractive index. Moreover, since the gradient of the refractive index spreads over a comparative wide range, it is impossible to form a number of micro lenses at narrow spaces.

SUMMARY OF THE INVENTION

It is, therefore, an object of the present invention to provide a process for producing micro lens with accuracy at low cost.

According to the present invention, there is provided a process for producing micro lens comprising:

locally heating and melting a workpiece made of a glass material, by irradiating energy beam to a surface of the workpiece;

forming the surface of the workpiece into a convexly curved surface under the effect of surface tension occurrable to the glass material at the time the work piece is melted; and hardening the workpiece to thereby form a micro lens having the convexly curved surface.

The glass material used in the process has a viscous property, the magnitude of which is sufficiently high to ensure that the convexly curved surface is formed under the effect of surface tension. At the same time, the glass material has a thermal expansion property, the magnitude of which is sufficiently low to prevent cracking of the glass material when the convexly curved surface is cooled.

DETAILED DESCRIPTION OF THE EMBODIMENT

One embodiment of the present invention will now be described with reference to the accompanying drawings.

Figure 1:
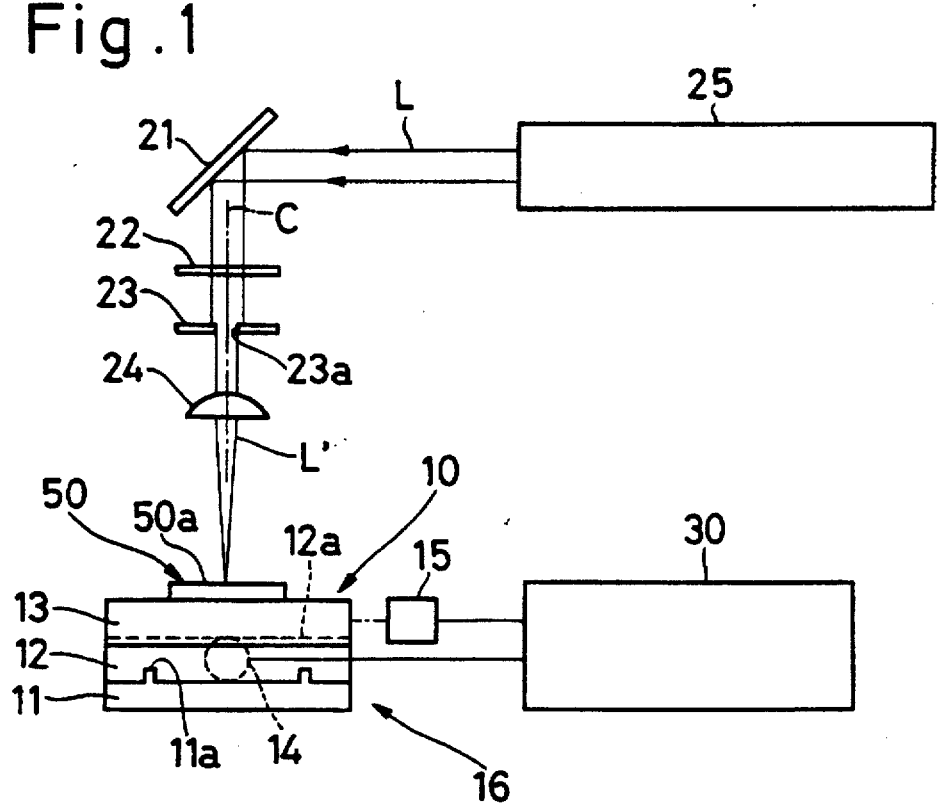
FIG. 1 is a schematic view of an apparatus for producing a micro lens array according to the present invention.

An apparatus shown in FIG. 1 is designed for producing a micro lens array including a number of micro lenses. This apparatus comprises a support means 10 for supporting a glass plate 50 in its horizontal posture. The support means 10 includes a base 11, a Y-stage 12, and an X stage 13. The Y-stage 12 is horizontally movable in a direction perpendicular to the surface of the paper along a pair of rails 11a formed on an upper surface of the base 11. The X-stage 13 is horizontally movable in the rightward and leftward direction (i.e., in the perpendicular direction to the direction of movement of the Y-stage 12) in the Figure along a pair of rails 12a formed on an upper surface of the Y-stage 12. Those stages 12 and 13 are moved, for example, by small-sized accurately-designed motors 14, 15, screw mechanisms, etc., not shown, respectively. A moving mechanism 16 for moving the glass plate 50 is constituted of the stages 12, 13 and the motors 14, 15. The motors 14 and 15 are intermittently driven by a control unit 30.

Right above the support means 10, there are a copper mirror 21, an aluminum shutter 22, an aluminum diaphragm 23, and a convex lens 24 (beam converging means) made of ZnSe which are arranged in this order from top along a vertical optical axis. The mirror 21 is inclined by 45 degrees. A $CO_2$ laser producer 25 (energy beam producing means) for producing a laser having a wavelength of 10.6 μm is disposed at the side of the mirror 21. The shutter 22 and laser producer 25 are controlled by the control unit 30. The diaphragm 23 is of a plate-like configuration and has an opening 23a of a true circle formed in the center of the diaphragm 23.

Figure 2:
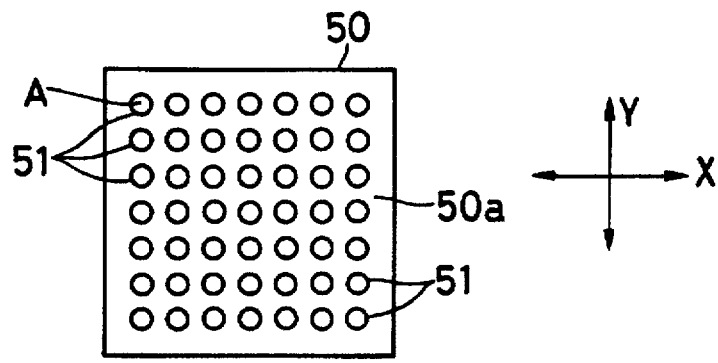
FIG. 2 is a plan view of a micro lens array thus made.

A process for producing micro lens array using the above apparatus will now be described. Firstly, the glass plate 50 is detachably set to the center of an upper surface of the X-stage 13 using a fixing tool, not shown. No-alkali glass (merchandise name: CORNING 7059), boro-silicated glass (merchandise name: PYREX), and the like, all of which are glass materials having heat resisting properties, low expansion properties and high viscous properties, are used as the material of the glass plate 50. As shown in FIG. 2, the glass plate 50 is of a regular square shape in plan view and has a predetermined thickness over the entire area thereof. With the glass plate 50 set to the upper surface of the X-stage 13, an upper surface 50a (surface) of the glass plate 50 is horizontal, and perpendicular to the optical axis C.

After the glass plate 50 is set, the motors 14 and 15 are driven by the control unit 30 in order to bring the optical axis C into alignment with a point A (FIG. 2) at one corner of the glass plate 50. On the other hand, parallel laser beam L (energy beam) are horizontally output from the laser producer 25 in response to an operation command signal from the control unit 30. The laser beam L proceed toward the mirror 21 and is then reflected by the mirror 21. The reflected laser beam L are allowed to pass through the shutter 22 during a period of time the shutter 22 is open for a predetermined time interval under the control of the control unit 30. After passing through the shutter 22, the laser beam L proceed downwardly along the optical axis C, passes through the diaphragm 23 and is then converged by the convex lens 24 so as to be supplied to the upper surface 50a of the glass plate 50. Here, the focal position of the converged laser beam L' (converged energy beam) is slightly shifted either upwardly or downwardly from this upper surface 50a. By doing this, the diameter of the spot on the upper surface 50a is established to 250 µm, for example. It should be noted, however, that the focal position may be coincident with the upper surface 50a.

Energy level of the converged laser beam L' is high enough to locally melt the glass plate 50. Attention should be paid to this feature.

Figure 3:
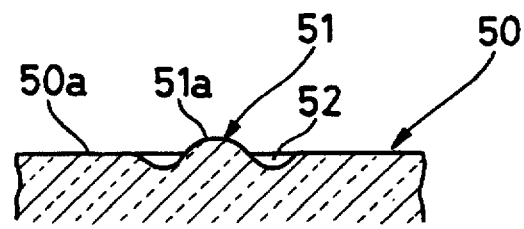
FIG. 3 is an enlarged sectional view of each micro lens in the micro lens array.

That portion of the upper surface 50a of the glass plate 50, which is subjected to the converged laser beam L', is melted. As shown in FIG. 3, the melted glass material is convexly raised under the effect of surface tension. An annular groove 52 is formed in the upper surface 50a around the convexly raised portion 51. This convexly raised portion 51 is generally of a semi-spherical configuration and has the convexly curved surface 51a. The convexly raised portion 51 is naturally cooled and hardened to form a micro lens. It should be noted that the melted glass material is readily convexly raised under the effect of surface tension because a material having a comparatively high viscosity is used as the glass material. Also, since a material having a low thermal expansion is used, cracking, which would otherwise be occurred due to thermal stress when the convexly raised portion 51 is hardened, can be prevented from occurring.

In the manner as mentioned above, the micro lens 51 is formed at the point A of the upper left corner in FIG. 2. Thereafter, the glass plate 50 is intermittently moved on a horizontal plane by the moving mechanism 16 and the converged laser beam are irradiated to the glass plate 50 each time the glass plate 50 is stopped. By doing this, micro lenses 51 are formed on the glass plate 50 one after another. More specifically, the parallel laser beam L are continuously irradiated until the micro lenses 51 are formed on the overall area of the glass plate 50. After the completion of formation of the micro lens 51 at the point A, the X-stage 13 is moved leftwardly, in FIG. 2, by a predetermined amount. Thereafter, the shutter 22 is opened for the predetermined time to allow the converged laser beam L' to be irradiated to the upper surface 50a of the glass plate 50 in the same manner as mentioned above, so that another micro lens 51 is newly formed on the right of the point A. Further, the X-stage 13 is intermittently moved and the converged laser beam L' are supplied each time the X-stage 13 is stopped. By doing this, one row of micro lenses 51 are formed on the glass plate 50.

After the micro lens 51 is formed on the upper right corner of the glass plate 50, the Y-stage 12 is moved downwardly, in FIG. 2, by the predetermined amount and another micro lens 51 is formed on the down side, in FIG. 2, of the upper right corner. Thereafter, the X-stage 13 is moved rightwardly to form new micro lenses 51 one after another on the second row. After the last micro lens 51 of the last row is formed on the lower right corner in FIG. 2, the glass plate 50 is detached from the X-stage 13.

According to the method mentioned above, since micro lenses 51 are formed by irradiating laser beam and without heating the glass plate 50, production thereof is comparatively easy. Moreover, since heating, removing of the coating on the mask, etc., which would otherwise be performed later, is no more required, the production cost can be reduced extensively. In addition, by utilizing the surface tension of the melted glass material, there can be obtained micro lenses 51, which are excellent in symmetry.

The glass plate 50 having a number of micro lenses 51 arranged in a two-dimensional matrix pattern as mentioned above can be used a lens array. Also, the individual micro lenses 51 can be cut out and used separately.

Figure 4:
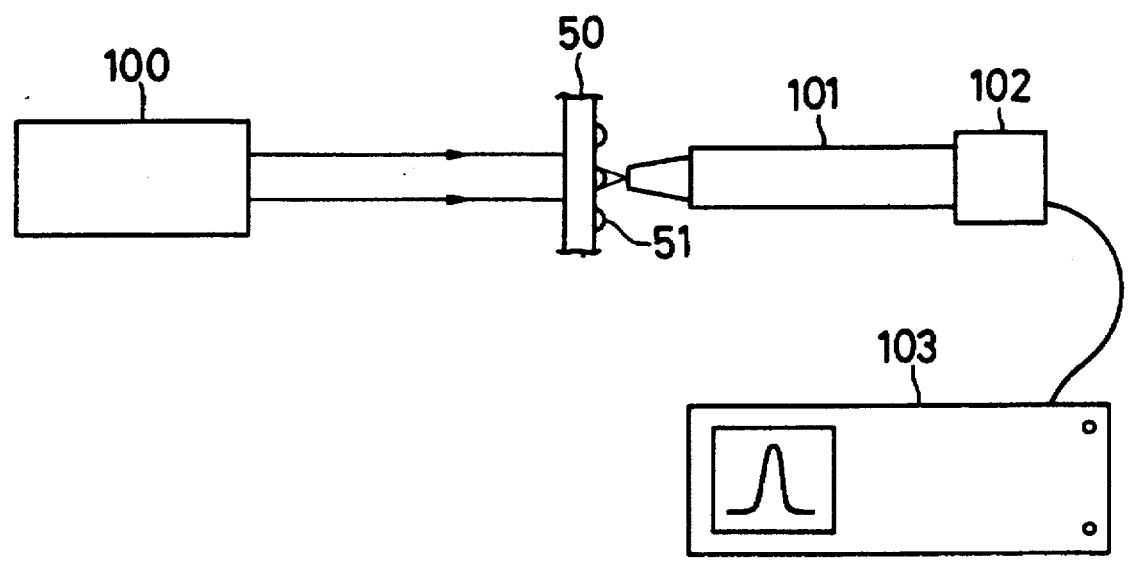
FIG. 4 is a schematic view showing a performance test of the micro lens.
Figure 5:
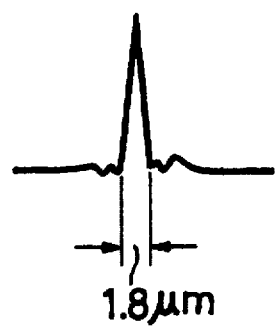
FIG. 5 is a chart showing the distribution of density of light gathered to a spot by the micro lens.

A performance test of the micro lenses 51 thus produced was carried out by a test system shown in FIG. 4. Specifically, parallel beam having a wavelength of 633 nm were irradiated to a surface of the lens array 50 from an He-Ne laser producer 100. This surface is opposite to the surface on which the micro lenses 51 are formed. The parallel beam were irradiated in a direction perpendicular to the first-mentioned surface. The laser beam were converged by the micro lenses 51, respectively. A light converged spot at the focal point was enlarged by a microscope 101. Then, this enlarged image was taken by a CCD camera 102. Then, the image pick-up signal is sent to an intensity distribution measuring device 103. The intensity distribution was observed. The diameter of the spot was about 1.8 µm. In this way, it could be confirmed that micro lenses 51 of very high precision were obtained. It should be noted that since the He-Ne laser is hardly absorbed by a glass material, it can be used for the performance test of the micro lenses 51.

In the system mentioned above, the diameter of the spot on the upper surface 50a of the converged laser beam L' can be adjusted by replacing the diaphragm 23 with another diaphragm 23 having an opening 23a of a different size. Therefore, the diameter of each micro lens 51 can be adjusted directly. A diaphragm 23 having an opening 23 of other shapes (e.g., elliptical shape) than a true circle may be used. In this case, since the shape of the spot of the laser beam L' on the surface 50a of the glass plate 50 is elliptical, etc. the shape of each micro lens 51 to be produced is also elliptical, etc.

The present invention is not limited to the above embodiment and many changes can be made. Acceptable examples of the laser include, in addition to the $CO_2$ laser, a CO laser (wavelength of 5.5 µm), an Er-YAG laser (wavelength of 3 µm), an excimer laser (wavelength of 308 nm), etc., which have a wavelength (350 nm or less, 1000 nm or more) particularly well absorbed by glass. If energy efficiency can be disregarded, a wider range of laser can of course be used.

Also, a three-dimensional matrix micro array may be obtained by forming micro lenses on each surface of a cubic or rectangular parallelepiped glass material.

In the case where the energy level of the laser beam is high, the parallel laser beam may be directly irradiated to the glass plate without being converged.

Also, in the case where the energy level of the laser beam is high, it may be designed such that a mask made of a laser reflecting material such as aluminum and having a number of openings arranged in a matrix pattern is attached or coated to the surface of the glass plate, and laser beam are irradiated to the generally overall area of the surface of the glass plate. In this case, micro lenses arranged in a matrix pattern are formed on the surface of the glass plate corresponding to the openings of the mask, and a micro lens array can be produced without a need of a provision of the moving mechanism.

As the energy beam, electronic beam and plasma beam can be used. If electronic beam and plasma beam are used as the energy beam, the beam may be converged by a known beam converging means constituted of an electromagnetic coil, etc. so as to be supplied to the glass material.

The energy beam may be irradiated in a direction inclined with respect to a line normal to the surface of the glass material.

The shutter and the diaphragm may be disposed between the reflecting plate and the laser producer.

What is claimed is:

1. A process for producing micro lenses comprising:
   locally heating and melting a workpiece made of glass material, by irradiating a flat surface of said workpiece with a laser beam;
   forming the surface of said workpiece into a convexly curved surface under the effect of surface tension occurrable to the glass material at the time the workpiece is melted; and
   hardening said workpiece to thereby form a micro lens having said convexly curved surface;
   wherein the glass material has a viscous property, the magnitude of which is sufficiently high to ensure that said convexly curved surface is formed, and a thermal expansion property, the magnitude of which is sufficiently low to prevent cracking of the glass material when the convexly curved surface is cooled.

2. A process for producing micro lenses according to claim 1, further comprising outputting parallel laser beam, and converging the parallel laser beam by a lens so that said converged parallel laser beam is supplied to the surface of said workpiece to thereby locally heat said workpiece.

3. A process for producing micro lenses according to claim 2, in which said workpiece is supported such that the surface of said workpiece is horizontal, and said converged parallel laser beam is supplied to said workpiece in a direction perpendicular to the upper surface of said workpiece.

4. A process for producing micro lenses according to claim 3, in which said workpiece is intermittently moved in a horizontal direction and said converged parallel laser beam is supplied to the surface of said workpiece each time said workpiece is stopped so that a plurality of micro lenses are formed in a matrix pattern.

5. A process for producing micro lenses according to claim 1, in which non-alkali glass and boro-silicated glass are used as said glass material of said workpiece.

* * * * *